Jan. 17, 1956  G. P. McCORD  2,731,028
VALVE
Filed Aug. 20, 1952
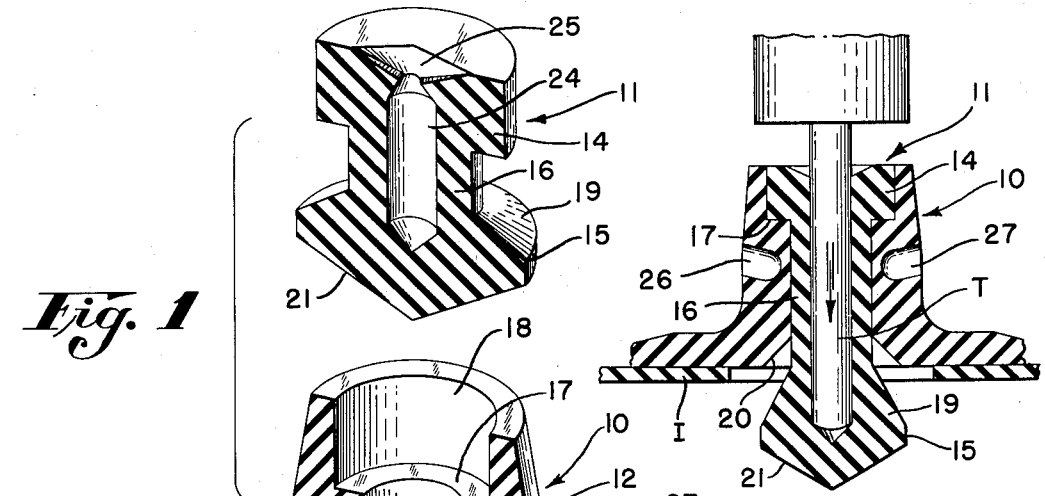
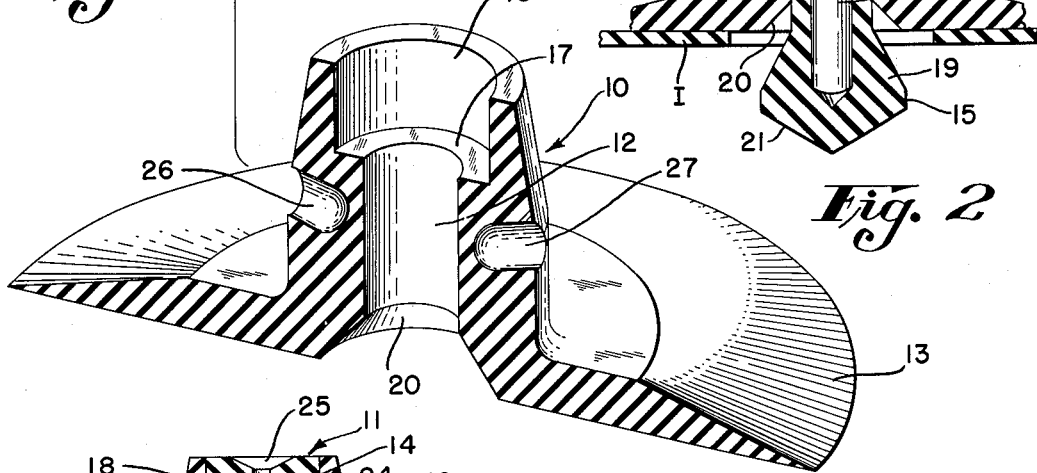
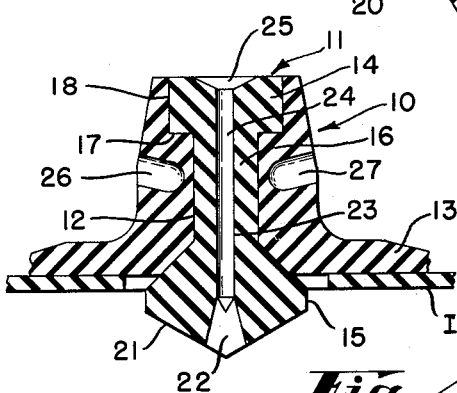
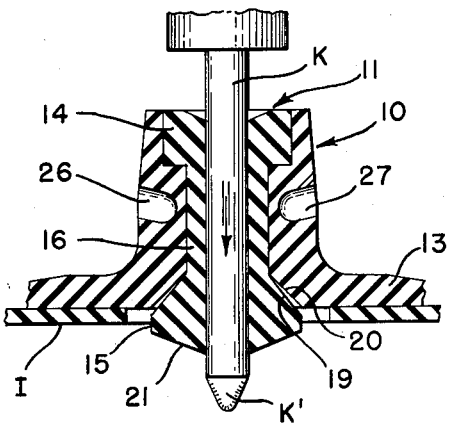
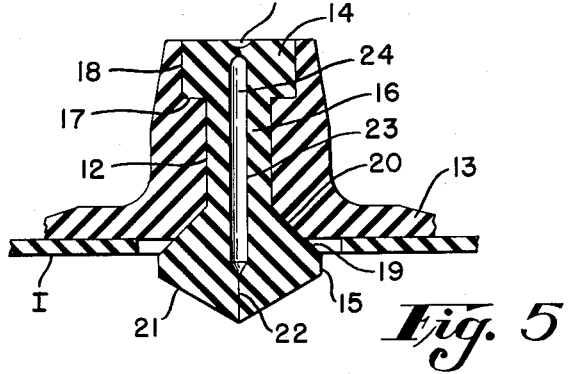
*INVENTOR.*
GEORGIE P. MC CORD
BY Irwin M. Lewis
ATTORNEY.

United States Patent Office 2,731,028
Patented Jan. 17, 1956

2,731,028

VALVE

Georgie P. McCord, Oaklandon, Ind., assignor to United States Rubber Company, New York, N. Y., a corporation of New Jersey Application August 20, 1952, Serial No. 305,338

10 Claims. (Cl. 137—223)

This invention relates to improvements in valves. In particular, it relates to a valve of the type having an elastic core provided with a small self-closing inflating passage through which an elongated hollow inflating needle may be inserted to inflate an inflatable article to which the valve is attached. Such valves are commonly used on pneumatic tires, balls, cushions and the like.

In valves of this type heretofore, the elastic core was made larger than the bore of a casing in which it was adapted to fit. By such a construction, the core when inserted in the bore was subjected to radial compressive forces which forced the walls of the inflating passage tightly together to effect a seal to prevent leakage of air therethrough. A valve of this type is shown in U. S. Patent No. 2,318,115.

The present invention differs from valves heretofore used in that the core is maintained in a partially stretched condition when inserted in the bore of a casing and the contractive forces created by reason of the stretched condition of the core are utilized to effect a wedging action between the core and the casing to provide an airtight seal between the core and the casing and to tightly seal the inflating passage along a portion of its length to prevent leakage of air therethrough. Special tapered surfaces are provided to facilitate the wedging action.

This wedging action provides a very effective sealing action over a small portion of the inflating passage so that the inflating passage may be left open along a considerable portion of its length to facilitate insertion of inflating needle.

By utilizing the contractive forces of the stretched core to effect the sealing of the inflating passage, as in the present invention, a much larger inflating passage may be used for a given outside diameter of the valve casing than can be used in a valve having the same casing diameter but utilizing radial compressive forces. This is due to the fact that in valves of the latter type, the larger the inflating passages made, the thicker the walls of the outer casing must be made in order to exert the necessary radial or constrictive forces to effect the seal of the inflating passage. This is not true in the construction of the present invention which does not rely on radial compressive forces to effect the sealing of the inflating passage and it is therefore not necessary to increase the wall thickness of its valve casing in order to increase the size of the inflating passage.

A large inflating passage is desirable in order to permit rapid inflation and deflation of the article to which the valve is attached. A large inflating passage is particularly desirable when the valve is used on an inner tube for a pneumatic tire so that it may be rapidly inflated and deflated when it is being cured in a curing mold. However, the size of the outside diameter and therefore the wall thickness of the valve casing of a valve as used on an inner tube is limited by the size of the valve stem rim opening in a standard tire rim. The size of the inflating passage of a valve of the type utilizing radial compressive forces to effect the sealing of the inflating passage as used on an inner tube is therefore limited by the size of the rim opening of the tire rim. Thus, where the dimension of the diameter of the outer casing of a valve is limited by the size of the rim opening in a standard tire rim, a much larger inflating passage may be provided using the valve construction of the present invention than in using a valve construction which utilizes radial compressive or constrictive forces to effect the sealing of the inflating passage.

The present invention also contemplates the provision of special structure to facilitate holding the valve while inserting or removing the core or while inserting or removing the inflating needle and for pulling the valve through the valve stem opening in a tire rim when the valve is used on a pneumatic tire.

It is also an object of the invention to provide a special construction for closing the outer end of the inflating passage to prevent entry of foreign material into the passage.

Other objects and advantages will become apparent from the following description when read in conjunction with the following drawing wherein:

Fig. 1 is an exploded sectional perspective view of the valve of the invention showing the valve core and valve casing unassembled;

Fig. 2 is a sectional view showing how the core is inserted in the casing;

Fig. 3 is a sectional view showing how the inflating passage through the core is completed after insertion of the core in the casing;

Fig. 4 is a sectional view showing the assembled valve after the inflating passage has been completed; and Fig. 5 is a sectional view taken at right angles to that of Fig. 4.

Referring to the drawings and in particular to Fig. 1 of the drawing, the valve of the invention includes a valve casing 10 and a valve core 11 which is adapted to be inserted in an axial bore 12 which extends through the casing 10. Both the valve casing 10 and the core 11 are made of elastic rubber so that either may be stretched or deformed, but will return to their original shape.

The valve casing 10 is generally cylindrical in shape and is provided with an enlarged circular base 13 so that it may be adhered to the exterior surface of an inflatable article such as shown at I in Figs. 2, 3, 4 and 5.

The core 11 is provided with two retaining flanges 14 and 15 formed adjacent opposite ends thereof. As can be seen in Fig. 1, the spacing between the flanges 14 and 15 is considerably less than the length of the bore 12 when the core 11 and casing 10 are unassembled. The portion 16 of the core 11 lying between the flanges 14 and 15 must, therefore, be stretched considerably to fit in the bore 12 when the core 11 and the casing 10 are assembled as shown in Figs. 4 and 5. The core 11 is maintained in a stretched condition when assembled in the casing 10 by engagement of flange 14 with a shoulder 17 formed at the juncture of an enlarged opening 18 with the upper end of the bore 12 and engagement of a tapered side 19 of the flange 15 with an outwardly tapered seat 20 formed at the lower end of the bore 12. The core 11 is, therefore, always under tensile stress when assembled in the casing 10 and the contractive force occasioned thereby tends to pull the flange 15 into the bore 12. This contractive force creates a wedging action between the tapered side 19 of the flange 15 and the tapered seat 20 of the bore 12. This wedging action created by the contractive force provides two sealing functions. First, it provides an airtight seal between the tapered seat 20 and the tapered side 19 to prevent leakage of air between the core 11 and the casing 10. Second, it places the lower end 21 of the core 11 under compression to force the walls of the lower section 22 of an inflating passage 23 which extends axially through the core tightly together to form an airtight seal as shown in Figs. 4 and 5. Both of these sealing actions are further enhanced by the build up of pressure within the inflatable article as the pressure acts on the lower end 21 of the core 11 to wedge it more tightly in the tapered seat 20.

Referring to Fig. 1, there can be seen that the angle of taper of the tapered side 19 of the flange 15 is considerably greater than the angle of taper of the tapered seat 20 of the bore 12 when the core 11 and casing 10 are unassembled. This difference in tapers is provided to compensate for the change in the angle of taper of the tapered side 19 of the flange 15 occasioned when the core 11 is stretched and assembled in the casing 10. When assembled, the two tapers are approximately the same.

The inflating passage 23, through which an inflating needle is adapted to be inserted, is made up of two communicating sections. The lower section 22, previously referred to, is slit shaped as shown in Figs. 4 and 5 so that the walls thereof may be more readily forced together by the wedging action to effect the seal as previously described. The upper section 24 of the inflating passage 23 is cylindrical in shape and remains open to facilitate insertion of the needle type inflating tool. As will hereinafter be described in detail, in order to facilitate insertion of core 11 in casing 10, it is desirable though not necessary to form the slit shaped section 22 after the core 11 has been inserted in the casing 10. The slit section 22 may be formed prior to insertion of the core 11 in the casing 10 by cutting or in molding the core 11.

Referring to Fig. 1, it can be seen that the portion 16 of the core 11 is made somewhat larger in diameter than the bore 12. Preferably the diameter of the portion 16 is made only sufficiently larger than the bore 12 to compensate for the reduction in diameter thereof occasioned when the core 11 is stretched and assembled in the casing 11. In this manner, the core 11 when assembled in the casing 10 will fit snugly in the bore 12 but will not be compressed radially to any substantial extent and the upper cylindrical section 24 of the passage 23 is thereby left open to facilitate insertion of an inflating needle while the lower section 22 is effectively sealed.

As can be best seen in in Figs. 1 and 4, the cylindrical section 24 of the inflating passage 23 communicates with the exterior at the upper end thereof by means of a small self-closing tapered slit passage 25. This passage 25 provides a closure for the passage 23 when the core 11 is assembled in the casing 10, as shown in Fig. 4, to prevent entry of foreign material. To insure that the slit passage 25 is closed when the core 11 is assembled in the casing 10, the flange 14 is made slightly larger in diameter than the opening 18 so that the slit passage 25 is maintained closed by radial compressive forces when the core 11 and casing 10 are assembled.

The casing 10 is provided with openings 26 and 27 in the exterior surface thereof so that the valve may be engaged by a bail type handle (not shown) or other special tool to hold the valve rigid while inserting or removing the core 11 or while inserting or removing a needle type inflating tool and for pulling the valve through the valve stem opening in a rim for a pneumatic tire.

Referring to Fig. 2, there is shown one method of insertion of the core 11 in the casing 10. As previously described, the slit section 22 of the inflating passage 23 is not formed until after the core 11 is inserted in the casing 10, therefore, prior to insertion only the cylindrical section 24 of the passage 23 is formed in the core 11 as shown in Fig. 1. In inserting the core 11 in the casing 10, the blunt end of an elongated rod T is inserted in the cylindrical section 24 of the passage 23 until it abuts against the bottom of the cylindrical section 24. The rod T is then forced in the direction of the arrow in Fig. 2 to stretch the elastic core 11 and force it through the bore 12 of the casing 10 until the flange 14 seats on the shoulder 17 and the flange 15 extends beyond the lower end of the casing 10. When the rod T is removed the core 11 snaps back so that the tapered side 19 of the flange 15 engages the tapered seat 20 of the bore 12 to provide the wedging action as previously described. The lower end 21 of the core 11 is made conical in shape to facilitate insertion.

After insertion of the core 11 in the casing 10, the slit section 22 of the passage 23 extending from the bottom of the cylindrical section 24 through the lower end 21 of the core 11 is cut by forcing a rod shaped tool K having a flat sharpened end K' down through the cylindrical section 24 as shown in Fig. 3. This completes the inflating passage 23 through the core so that an inflating needle can be inserted through the passage to inflate an article to which the valve is attached. The wedging action between the tapered side 19 of the flange 15 and the tapered seat 20 of the bore 12 seals the slit section 22 when the needle is withdrawn.

From the above description, it can be seen that there is provided an improved valve of the type used in conjunction with a needle type inflating tool. This improved valve utilizes the contractive forces of a stretched elastic core to effect a wedging action between the core and the surrounding casing to tightly seal the inflating passage and also to effect an airtight seal between the core and casing. This wedging action provides a very effective sealing action over a small portion of the inflating passage so that the inflating passage may be left open along a considerable portion of its length to facilitate insertion of an inflating needle. The build up of pressure within the inflatable article on which the valve is used increases the wedging action and the efficiency of the sealing. By utilizing the contractive force of the stretched core to effect the sealing of the inflating passage, a much larger inflating passage, permitting more rapid inflation and deflation may be used for a given outside diameter of the valve casing than can be used in a valve having the same casing diameter but utilizing radial compressive forces to effect the sealing.

It is to be understood that the above description and the accompanying drawing is for the purpose of illustration only and not by way of limitation and changes and modifications may be made therein without departing from the spirit and the scope of the invention.

Having thus described my invention, what I claim and desire to protect by Letters Patent is:

1. A valve comprising, a valve casing having an axially extending bore therethrough, an elastic core in said bore, said elastic core having an axially extending inflating passage therethrough, said elastic core having a retaining flange adjacent each end thereof, the spacing between said flanges when the core is in an unstretched condition being less than the length of the bore whereby said elastic core must be stretched axially to insert it in said bore, the portion of said core between said flanges being of a diameter with respect to the diameter of said bore that said portion of said core when stretched and assembled in said bore is not compressed radially to any substantial extent, said retaining flanges serving to retain the core in the stretched condition when it is in the bore, one of said flanges being tapered inwardly on the side adjacent the casing whereby the contractive forces occasioned by the stretched condition of the core in the bore create a wedging action between the tapered side of said flange and the casing to place the end of the core under compression to tightly seal the end of the inflating passage.

2. A valve comprising, a valve casing having an axially extending bore therethrough, said bore being tapered outwardly at one end thereof, an elastic core in said bore, said elastic core having an axially extending inflating passage therethrough, said elastic core having a retaining flange adjacent each end thereof, the spacing between said flanges when the core is in an unstretched condition being less than the length of said bore whereby said core must be stretched axially to insert it in the bore, the portion of said core between said flanges being of a diameter with respect to the diameter of said bore that said portion of said core when stretched and assembled in said bore is not compressed radially to any substantial extent, said flanges serving to retain the core in the stretched condition while it is in the bore, the retaining flange adjacent the tapered end of the bore being tapered inwardly toward the casing whereby the contractive forces occasioned by the stretched condition of the core create a wedging action between the tapered end of the bore and the tapered side of said flange to place the end of the core under compression to tightly seal the end of the inflating passage.

3. A valve comprising, a valve casing having an axially extending bore therethrough, an elastic core member in said bore, said elastic core member having an axially extending inflating passage therethrough, said inflating passage being substantially cylindrical throughout a considerable portion of its length to facilitate insertion of a needle type inflating tool, but terminating in a slit type passage adjacent the inner end of the core, said elastic core member having a retaining flange adjacent each end thereof, the spacing of said flanges when the core is in an unstretched condition being less than the length of said bore whereby said core must be stretched to insert the core in said bore, the portion of said core between said flanges being of a diameter with respect to the diameter of said bore that said portion of said core when stretched and assembled in said bore is not compressed radially to any substantial extent, said retaining flanges serving to retain the core in a stretched condition while in the bore, the flange adjacent said inner end being tapered inwardly toward said casing whereby the contractive forces occasioned by the stretched condition of the core in the bore create a wedging action between the tapered side of said flange and the casing to place the end of the core under compression to tightly seal the slit type passage.

4. A valve comprising, a valve casing having an axially extending bore therethrough, said bore being tapered outwardly at one end thereof, an elastic core member in said bore, said elastic core member having an axially extending inflating passage therethrough, said inflating passage being substantially cylindrical throughout a considerable portion of its length to facilitate insertion of a needle type inflating tube, but terminating in a slit type passage adjacent the inner end thereof, said elastic core member having a retaining flange adjacent each end thereof, the spacing of said flanges when the core is in an unstretched condition being less than the length of said bore whereby said core must be stretched to insert the core in said bore, the portion of said core between said flanges being of a diameter with respect to the diameter of said bore that said portion of said core when stretched and assembled in said bore is not compressed radially to any substantial extent, said retaining flanges serving to retain the core in the stretched condition while in the bore, the retaining flange adjacent the tapered end of the bore being tapered inwardly toward the casing whereby the contractive forces occasioned by the stretched condition of the core create a wedging action between the tapered end of the bore and the tapered side of said flange to place the end of the core under compression to tightly seal the end of the inflating passage.

5. A valve comprising, a casing having an axially extending bore therethrough, said bore being tapered outwardly at one end thereof, an elastic core member in said bore, said elastic core member having an axially extending inflating passage therethrough, said elastic core member having a retaining flange adjacent each end thereof, the spacing between said flanges when the core is in an unstretched condition being less than the length of said bore whereby said core must be stretched axially to insert it in the bore, the portion of said core between said flanges being of a diameter with respect to the diameter of said bore that said portion of said core when stretched and assembled in said bore is not compressed radially to any substantial extent, said flanges serving to retain the core in the stretched condition when it is in the bore whereby the contractive forces occasioned by the stretched condition of the core creates a wedging action between the tapered end of the bore and of one of said flanges to place one end of the core under compression to tightly seal the end of the inflating passage.

6. A valve for an inflatable article comprising, a casing having an axially extending bore therethrough, said bore being tapered outwardly adjacent one end thereof, an elastic core member in said bore, said elastic core member having an axially extending inflating passage therethrough, said inflating passage being substantially cylindrical throughout a considerable portion of its length to facilitate insertion of a needle type inflating tube, but terminating in a slit type passage adjacent one end thereof, said elastic core member having a retaining flange adjacent each end thereof, the spacing of said flanges when the core is in an unstretched condition being less than the length of said bore whereby said core must be stretched to insert the core in said bore, the portion of said core between said flanges being of a diameter with respect to the diameter of said bore that said portion of said core when stretched and assembled in said bore is not compressed radially to any substantial extent, said retaining flanges serving to retain the core in the stretched condition while in the bore, whereby the contractive forces occasioned by the stretched condition of the core in the bore create a wedging action between the tapered end of the bore and one of said flanges to place the end of the core under compression to tightly seal the slit type passage.

7. A valve comprising, a valve casing having an axially extending bore therethrough, an elastic core member in said bore, said elastic core member having an axially extending inflating passage therethrough, said inflating passage being substantially cylindrical throughout a considerable portion of its length to facilitate insertion of a needle type inflating tool, but terminating in a slit type passage adjacent the inner end of the core, said cylindrical portion of said passage being provided with a self-closing passage closing the end thereof remote from said slit type passage to prevent entry of foreign material therein, said elastic core member having a retaining flange adjacent each end thereof, the spacing between said flanges when the core is in an unstretched condition being less than the length of said bore whereby said core must be stretched to insert the core in said bore, the portion of said core between said flanges being of a diameter with respect to the diameter of said bore that said portion of said core when stretched and assembled in said bore is not compressed radially to any substantial extent, said retaining flanges serving to retain the core in the stretched condition when it is in the bore, the side of said flange adjacent said inner end being tapered inwardly toward said casing whereby the contractive forces occasioned by the stretched condition of the core in the bore creates a wedging action between the tapered side of said flange and the casing to place the end of the core under compression to tightly seal the slit type passage.

8. A valve comprising, a valve casing having an axially extending bore therethrough, said bore being tapered outwardly at one end thereof, an elastic core member in said bore, said elastic core member having an axially extending inflating passage therethrough, said inflating passage being substantially cylindrical throughout a considerable portion of its length to facilitate insertion of a needle type inflating tool, but terminating in a slit type passage adjacent the inner end of the core, said cylindrical portion of said passage being provided with a self-closing passage closing the end thereof remote from said slit type passage to prevent entry of foreign material therein, said elastic core member having a retaining flange adjacent each end thereof, the spacing between said flanges when the core is in an unstretched condition being less than the length of said bore whereby said core must be stretched to insert the core in said bore, the portion of said core between said flanges being of a diameter with respect to the diameter of said bore that said portion of said core when stretched and assembled in said bore is not compressed radially to any substantial extent, said retaining flanges serving to retain the core in the stretched condition while in the bore, the retaining flange adjacent the tapered end of the bore being tapered inwardly toward the casing whereby the contractive forces occasioned by the stretched condition of the core create a wedging action between the tapered end of the bore and the tapered side of said flange to place the end of the core under compression to tightly seal the slit type passage.

9. A valve comprising, a valve casing having an axially extending bore therethrough, said bore being tapered outwardly at one end thereof, an elastic core member in said bore, said elastic core member having an axially extending inflating passage therethrough, said elastic core member having a retaining flange adjacent each end thereof, the spacing between said flanges when the core is in an unstretched condition being less than the length of said bore whereby said core must be stretched axially to insert it in the bore, the portion of said core between said flanges being of a diameter with respect to the diameter of said bore that said portion of said core when stretched and assembled in said bore is not compressed radially to any substantial extent, said flanges serving to retain the core in the stretched condition when it is in the bore, the retaining flange adjacent the tapered end of the bore being tapered inwardly toward the casing whereby the contractive forces occasioned by the stretched condition of the core create a wedging action between the tapered end of the bore and the tapered side of said flange to place the end of the core under compression to tightly seal the end of the inflating passage, and openings in the outer surfaces of said casing to facilitate gripping the valve.

10. A valve comprising a valve casing having an axially extending bore therethrough, an elastic core member in said bore, said elastic core member having an axially extending inflating passage therethrough, said elastic core member having a retaining flange adjacent each end thereof, the spacing between said flanges when the core is in an unstretched condition being less than the length of said bore and the portion of said core between said flanges being of a diameter with respect to the diameter of the bore that said portion of the core when assembled in said bore is not compressed to any substantial extent whereby said portion of the core when assembled in said bore is maintained in axially tensioned condition and said flanges placed under compression to tightly seal the inflating passage therethrough.

References Cited in the file of this patent

UNITED STATES PATENTS

| 670,725 | Pickett | Mar. 26, 1901 |
| 795,642 | Nelson | July 25, 1905 |
| 1,641,382 | Goldsmith | Sept. 6, 1927 |
| 1,732,158 | Ford | Oct. 15, 1929 |
| 1,951,565 | Sonnett | Mar. 20, 1934 |
| 2,176,565 | Boynton | Oct. 17, 1939 |
| 2,288,889 | Costello | July 7, 1942 |
| 2,318,115 | Tubbs | May 4, 1943 |
| 2,585,286 | Tubbs | Feb. 12, 1952 |
| 2,634,785 | Tubbs | Apr. 14, 1953 |